United States Patent [19]

Gulbrandsen

[11] 4,383,784

[45] May 17, 1983

[54] METHOD AND MEANS OF MANUFACTURING A ROTARY CUTTING TOOL

[75] Inventor: Richard C. Gulbrandsen, Naperville, Ill.

[73] Assignee: Precision Twist Drill & Machine Co., Crystal Lake, Ill.

[21] Appl. No.: 312,263

[22] Filed: Oct. 16, 1981

Related U.S. Application Data

[63] Continuation-in-part of Ser. No. 110,210, Jan. 7, 1980, abandoned.

[51] Int. Cl.³ .................... B23B 27/18; B23B 51/02
[52] U.S. Cl. ................................ 408/144; 76/101 A; 76/108 T
[58] Field of Search ............ 76/101 A, 108 R, 108 T; 408/144, 713

[56] References Cited

U.S. PATENT DOCUMENTS

| 756,339 | 4/1904 | Down | 76/108 T |
| 1,887,372 | 11/1932 | Emmons | 76/108 R |
| 3,053,118 | 9/1962 | Lavallee | 76/108 R |

FOREIGN PATENT DOCUMENTS

| 616116 | 1/1949 | United Kingdom | 76/101 A |
| 629012 | 9/1978 | U.S.S.R. | 76/101 A |
| 616116 | 1/1949 | United Kingdom | 76/101 A |

*Primary Examiner*—Roscoe V. Parker
*Attorney, Agent, or Firm*—W. A. Snow

[57] ABSTRACT

The production of rotary cutting tools using very small amounts of premium alloy steel such as tungsten or cobalt as the primary cutting or wearing surface welded to a longer lower grade of tool steel as the secondary wearing or cutting surface.

9 Claims, 7 Drawing Figures

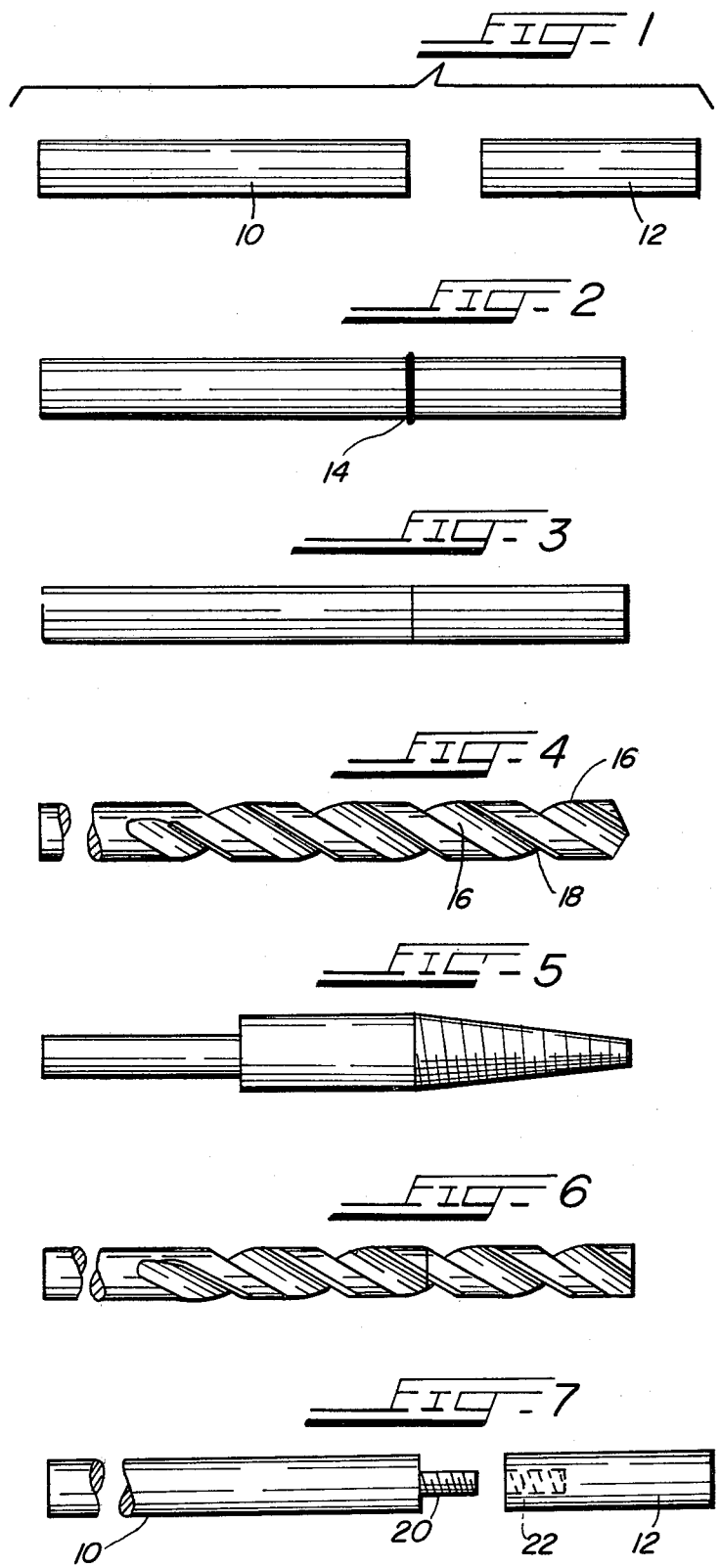

METHOD AND MEANS OF MANUFACTURING A ROTARY CUTTING TOOL

BACKGROUND OF THE INVENTION

This application is a continuation-in-part of Ser. No. 110,210 filed Jan. 7, 1980, now abandoned for Method and Means of Manufacturing a Rotary Cutting Tool.

SUMMARY OF THE INVENTION

The method and means for producing a rotary cutting tool wherein a longer length of a cylindrical rod of a lower grade alloy tool steel is butt welded to a high grade alloy tool steel such as cobalt or tungsten of a length adequate to cover only the cutting or wearing area of the cutting tool to be made, then annealed to soften the weld, then means applied to straighten out any distortion caused by welding, then machined or ground to form the cutting tool product and hardened, whereby the entire weld becomes a homogeneous matrix at the weld and the entire tool having an allover Rockwell hardness of 63.5 to 65.5 on the C Scale. This decreases the cost of the tool and gives it longer useful life.

BRIEF DESCRIPTION OF THE DRAWINGS

FIG. 1 is a side elevational view of a cylindrical piece of alloy tool steel of length and a smaller length cylindrical piece of tungsten or cobalt alloy tool steel shown spaced apart;

FIG. 2 is a side elevational view showing the two cylindrical pieces of FIG. 1 butt welded together;

FIG. 3 is a side elevational view of the joined pieces after annealing and straightening with the excess welding material removed;

FIG. 4 is a side elevational view of a finished drill made by machining the device of FIG. 3;

FIG. 5 is a side elevational view of a finished hob using the pieces of FIG. 1;

FIG. 6 is a side elevational view of a finished end mill using the pieces of FIG. 1; and FIG. 7 shows a modified manner of fastening the two pieces of FIG. 1 together.

DETAILED DESCRIPTION OF THE DRAWINGS

The method and means of producing a cutting tool consisting of taking a longer length of cylindrical alloy of tool steel 10, having properties to achieve Rockwell hardness levels of 63.5 to 65.5 on the C scale (called the secondary wearing surface), and a much shorter length of cylindrical cobalt or tungsten grade alloy steel 12 (called a primary wearing surface) and anchoring them together by butt welding 14, as shown in FIG. 2, in end-to-end relationship.

The next step is to place the joined pieces in an annealing furnace to soften the weld preferably at a temperature of approximately 1550° F. Then the annealed piece is placed on rollers or between centers to straighten out any distortion caused either by the welding or annealing.

The next step is then to machine the joined pieces of FIG. 3 to a twist drill (see FIG. 4) or a hob (see FIG. 5) or an end mill (see FIG. 6).

Although not shown in the drawings, all rotary cutting tools such as reamers, taps, core drills, counterbores, step drills, center drills, and others, are made by the present inventive concept. The showing in the drawings FIGS. 4, 5 and 6, is only exemplary of various rotary cutting tools that can be made from this method.

The form and shape of the rotary cutting tool, such as the twist drills of FIG. 4, are then turned to the shape of the specific tool, and flutes 16 and cutting edges 18 are incorporated therein either by milling or grinding.

The final step in the process is heat treating the cutting tool to harden the tool preferably at a temperature of 2200° F. and quenching at a temperature of about 1000° F. and the tool may be given surface treatment, such as polishing, finishing, or the surface is treated with steam oxide, whereby the tool has an homogeneous mass at the weld zone and the entire tool has a Rockwell hardness of 63.5 to 65.5 on the C scale.

The primary wearing or cutting surface is the normal cutting surface and the secondary or cutting surface is the shank.

It will be understood that details of the construction shown may be altered or omitted without departing from the spirit of the invention as defined by the following claims.

I claim:

1. The method of making a rotary cutting tool comprising taking a length of low grade, cylindrical tool steel having properties to achieve a Rockwell hardness level of 63.5 to 65.5 on the C scale and butt welding a short length of cylindrical high grade tool steel, together in end-to-end relationship, then annealing the joined pieces to soften the weld, then removing any distortion caused by the welding, and then forming the cutting tool and hardening the same all over, including the weld zone, to achieve a homogeneous mass having a Rockwell hardness of 63.5 to 65.5 on the C scale, thereby forming a secondary and primary wearing surface, and then machining the pieces to form a usable tool.

2. The method of making a rotary cutting tool comprising taking a length of low grade, cylindrical tool steel having properties to achieve a Rockwell hardness level of 63.5 to 65.5 on the C scale and butt welding a short length of cylindrical high grade tool steel, together in end-to-end relationship, then annealing the joined pieces to soften the weld at a preferred temperature of approximately 1550° F. to remove any distortion caused by the welding, and then forming the cutting tool and hardening the same all over, including the weld zone, to achieve a homogeneous mass having a Rockwell hardness of 63.5 to 65.5 on the C scale, thereby forming a secondary and primary wearing surface, and then machining the pieces to form a usable tool.

3. The method of claims 1 or 2 wherein the high grade tool steel is tungsten alloy.

4. The method of claims 1 or 2 wherein the high grade tool steel is cobalt alloy.

5. The method according to claims 1 or 2 wherein the cutting tool is given a surface treatment to polish the surface.

6. The article constructed from the method of claim 5 is a twist drill.

7. The article constructed from the method of claim 5 is a reamer.

8. The article constructed from the method of claim 5 is an end mill.

9. The article constructed from the method of claim 5 is a hob.

* * * * *